United States Patent [19]
Ostgaard

[11] Patent Number: 5,957,326
[45] Date of Patent: *Sep. 28, 1999

[54] APPARATUS FOR RETRIEVING RANDOMLY ORGANIZED ARTICLES

[76] Inventor: John T. Ostgaard, 7855 Vicksburg, Los Angeles, Calif. 90045

[*] Notice: This patent issued on a continued prosecution application filed under 37 CFR 1.53(d), and is subject to the twenty year patent term provisions of 35 U.S.C. 154(a)(2).

[21] Appl. No.: 08/615,710

[22] Filed: Mar. 13, 1996

Related U.S. Application Data

[63] Continuation-in-part of application No. 08/403,064, Mar. 13, 1995, abandoned.

[51] Int. Cl.⁶ ..................................................... B23Q 7/04
[52] U.S. Cl. ............................................. 221/211; 29/743
[58] Field of Search .................. 221/211, 9, 92, 221/282; 29/743

[56] References Cited

U.S. PATENT DOCUMENTS

| | | | |
|---|---|---|---|
| 2,524,673 | 10/1950 | Martin | 226/2 |
| 3,757,995 | 9/1973 | Armstrong | 221/211 |
| 3,986,638 | 10/1976 | DeHart | 221/150 |
| 4,018,358 | 4/1977 | Johnson et al. | 221/7 |
| 4,351,518 | 9/1982 | Stievenart | 271/90 |
| 4,372,802 | 2/1983 | Harigane et al. | 156/538 |
| 4,375,126 | 3/1983 | Dull | 29/740 |
| 4,473,922 | 10/1984 | Weihe | 15/306 B |
| 4,513,957 | 4/1985 | Schaefer, Jr. | 271/90 |
| 4,546,901 | 10/1985 | Buttarazzi | 221/10 |
| 4,561,687 | 12/1985 | Bostrom | 294/64.1 |
| 4,598,810 | 7/1986 | Shore et al. | 194/205 |
| 4,639,875 | 1/1987 | Abraham et al. | 364/479 |
| 4,677,278 | 6/1987 | Knoll | 219/214 |
| 4,721,197 | 1/1988 | Hoffman | 194/235 |
| 4,787,533 | 11/1988 | Haroutel et al. | 221/12 |
| 4,823,984 | 4/1989 | Ficken | 221/96 |
| 5,097,986 | 3/1992 | Domberg et al. | 221/150 R |
| 5,240,139 | 8/1993 | Chirnomas | 221/2 |

*Primary Examiner*—Kenneth Noland
*Attorney, Agent, or Firm*—Larkin, Hoffman, Daly & Lindgren, Ltd.

[57] ABSTRACT

A dispensing apparatus for selectively dispensing articles from an inner cavity of a bin. The apparatus includes a pick-up head having a plurality of spaced suction cups which is moveably supported by a positioning assembly. The positioning assembly locates the pick-up head at various positions relative to the inner cavity of the bin to retrieve randomly organized articles within the bin. The dispensing apparatus includes a vacuum control assembly which is coupled to a vacuum source for selectively applying a suction pressure to the suction cups of the pick-up head. The suction pressure attracts the articles stored in the bin towards the suction cups to retrieve an article from the bin to be dispensed. A sensing assembly is coupled to each of the suction cups to determine whether an article is attached to the suction cup. The vacuum control assembly is coupled to the sensing assembly to selectively apply and release suction pressure to the suction cups. When the sensing assembly senses at least one suction cup having an article attached thereto, the vacuum control assembly releases pressure to all but one designated suction cup having an article attached thereto to dispense a single article.

19 Claims, 8 Drawing Sheets

APPARATUS FOR RETRIEVING RANDOMLY ORGANIZED ARTICLES

BACKGROUND OF THE INVENTION

This application is a continuation-in-part of application Ser. No. 08/403,064 filed Mar. 13, 1995 entitled SYSTEM FOR DISPENSING RANDOMLY ORGANIZED ARTICLES now abandoned.

The present invention relates to an apparatus for retrieving randomly organized articles from a bin. In particular, the invention relates to an apparatus for selecting and retrieving a single article from a bin of randomly organized articles.

Apparatus which dispense products are widely used. Typical apparatus include a user interface which is coupled to a dispensing mechanism of the apparatus. The user may select an article to dispense and based upon the user's selection, the dispensing mechanism of the apparatus will dispense an article. Past dispensing mechanisms require that the articles be stored in a dispensing compartment in an organized fashion for the dispensing mechanism to operate. If the articles are not stored in an organized fashion, then the dispensing mechanism is not able to locate and dispense the designated article.

For example, dispensing apparatus are known where articles are aligned in longitudinal rows so that articles are aligned one in front of another. The article positioned at a front of the row is sequentially dispensed based upon a user's selection. A cork screw type mechanism or a pusher type mechanism may be used to sequentially push rear articles forward to be dispensed. Another type of apparatus may use a dispensing mechanism which has a suction member to retrieve articles stacked in a plurality of pre-positioned compartments. In such type of apparatus, a suction member is positioned relative to pre-positioned compartments to align the suction member with a selected compartment to dispense an article from the selected compartment. In each of the types of apparatus described, it is necessary to stack the articles in rows or in compartments to be dispensed.

It is expensive and time consuming to maintain and load a dispensing apparatus which requires specific organization and arrangement of articles to be dispensed in a dispensing compartment or row. It would be desirable to dispense articles which can just be thrown into a bin without any concern as to the arrangement or order of the articles. A dispensing apparatus which dispenses from a bin irregardless of the order of the articles, would eliminate the requirement for stacking articles and would reduce the time and expense required to load and maintain such an apparatus.

SUMMARY OF THE INVENTION

The present invention relates to an apparatus for dispensing articles from an inner cavity of a bin. The apparatus includes a pick-up head which is moveable supported by a positioning assembly. The pick-up head includes a plurality of suction cups. The positioning assembly aligns the pick-up head relative to the articles stored in the bin. A vacuum assembly applies a suction pressure to the suction cups to attract articles in the bin toward the suction cups of the pick-up head.

A vacuum control assembly is included to selectively control suction pressure to the multiple suction cups. The vacuum control assembly is coupled with the vacuum assembly and a means for sensing whether an article is coupled to each of the suction cup. Once the sensing means detects that at least one of the suction cups has an article coupled to the suction cup, the vacuum control assembly releases suction pressure to all but one designated suction cup having an article coupled thereto to dispense a single article from the machine. Thereafter, the designated suction cup dispenses the article from the apparatus. As described, the apparatus of the present invention eliminates the requirement that articles be stacked in an organized fashion. Furthermore, as described articles of various dimensions and shapes may be dispensed without pre-stacking the articles or concern that multiple articles will be dispensed in a single operation cycle.

DETAILED DESCRIPTION OF THE PREFERRED EMBODIMENT

Figure 1:
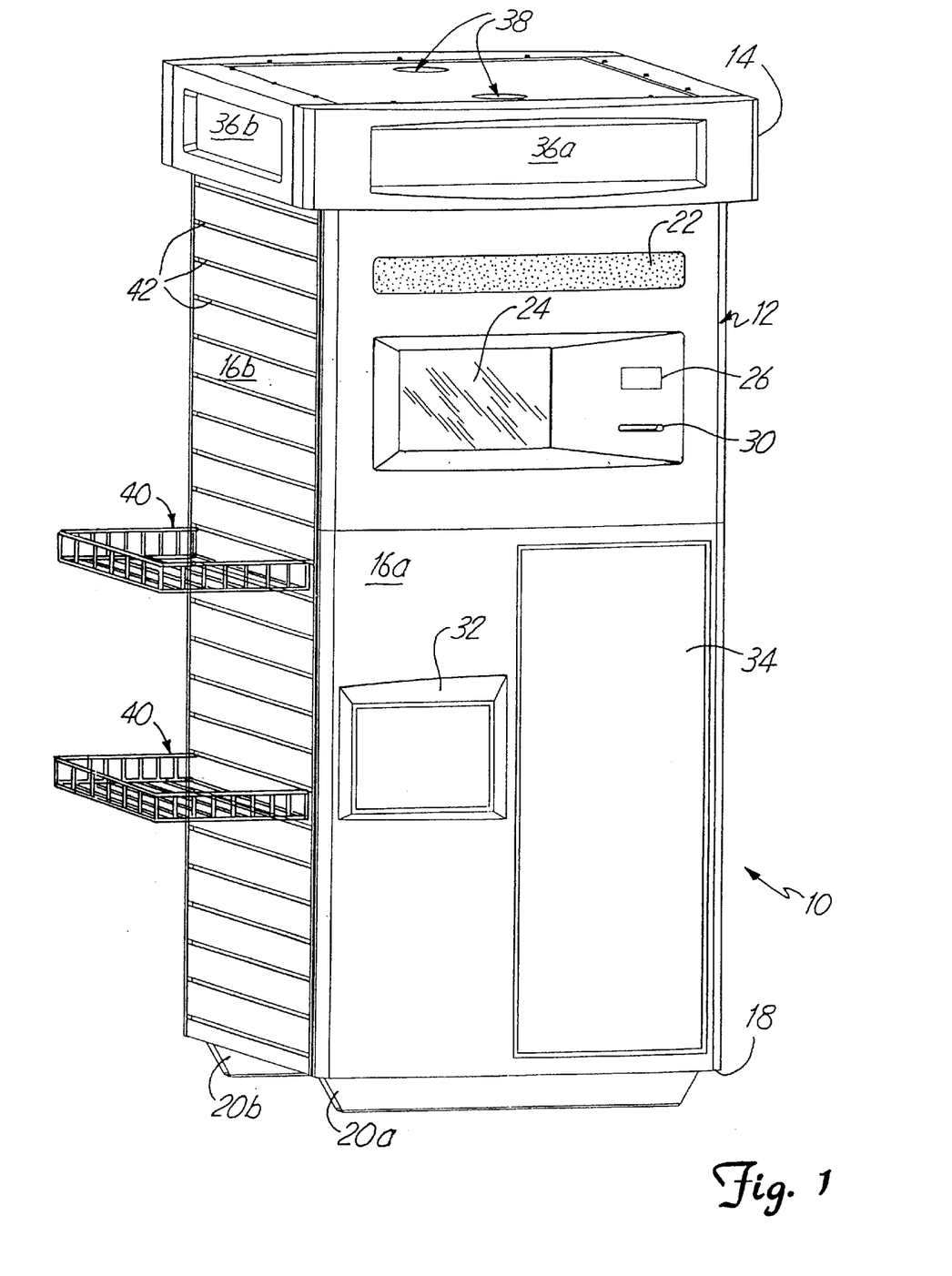
FIG. 1 is a perspective view of a dispensing machine of the present invention.

FIG. 1 is a perspective view of a dispensing machine 10 of the present invention. The dispensing machine 10 stores and dispenses articles for distribution. The dispensing machine 10 includes an outer cabinet 12 having a top 14, side panels 16a–d (panels 16c–d are not shown in FIG. 1), a base 18 and feet 20a and 20b. Panels 16a–d are essentially perpendicularly connected relative to the base 18 to form the outer cabinet 12. Top 14 encloses an upper portion of the cabinet 12. Opposed feet 20a–20b extend downwardly from the base 18 to support the base 18 of the cabinet 12 above the ground or floor surface.

As shown in FIG. 1, front panel 16a includes a speaker(s) 22, a display monitor 24, a card reader 26, a printer 30, a dispensing chute 32 and a display section 34. Preferably, the machine 10 has various operating options. The various functions of the machine 10 are displayed for the customer on the monitor 24, which may be a touch screen monitor. The user may choose the desired option by touching (or applying pressure) to the position of the screen associated with each option. The speaker 22 is operably coupled with the display monitor 24 to verbally instructions to the customer. It is also contemplated that the display monitor 24 and the speaker 22 may play entertaining promotional videos for advertising various products.

Figure 1A:
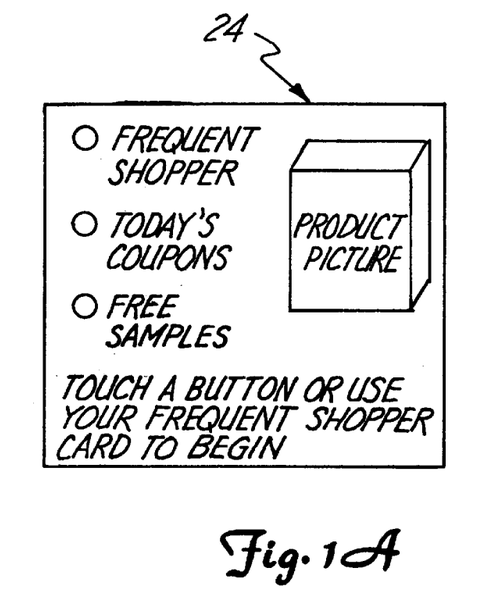
FIG. 1A is a plan view of an example display of the display monitor of the dispensing machine of FIG. 1.

An example of a display of the monitor 24 is illustrated in FIG. 1A. As shown in FIG. 1A, the various operating options may include, for example, dispensing an article or requesting a coupon (or other printed receipt or document). Articles are dispensed from the dispensing machine 10 via chute 32. The printer 30 may be any programmable printer which prints coupons or other documents, such as receipts. To dispense a coupon or product, the user chooses the appropriate option on the display monitor 24. It is contemplated that the user may choose from a variety of coupons which are displayed for selection on the monitor 24. Advertisements and other material may be displayed in the display surface 34.

The top 14 includes LED displays 36a–d (only LED displays 36 a–b shown) and cooling fans 38. LED displays 36a–d encircle the top 14 of the dispensing machine 10 and display a preprogrammed message. Cooling fans 36 help ventilate an inner compartment of the dispensing machine 10. Panels 16b and 16d (not shown) may have spaced display shelves 40 extending therefrom. As shown in FIG. 1, the display shelves 40 may be detachably connected to side 16b as shown via a plurality of spaced elongated cross grooves 42 extending along the height of panel 16b. Display shelves 40 include a bracket (not shown) sized for insertion into one of said grooves 42 to cantileverly support the display shelves 40.

It is contemplated that the dispensing machine 10 as described may be used to dispense product samples as well as discount coupons. Actual product for sale would be displayed on display shelves 40. The dispensing machine 10 may also include a preferred shopper feature which allows the user to register and receive a machine readable magnetic strip card which may be provided separately. If the user decides to become a preferred shopper, the user can register by inputting his or her name and address via monitor 24. The preferred shopper feature provides the user with special promotional discounts and other promotional benefits. The magnetic strip card may be inserted into the card reader 26, which may be any programmable magnetic card reader, to operate the dispensing machine to receive samples and preferred shopper select coupons.

Figure 2:
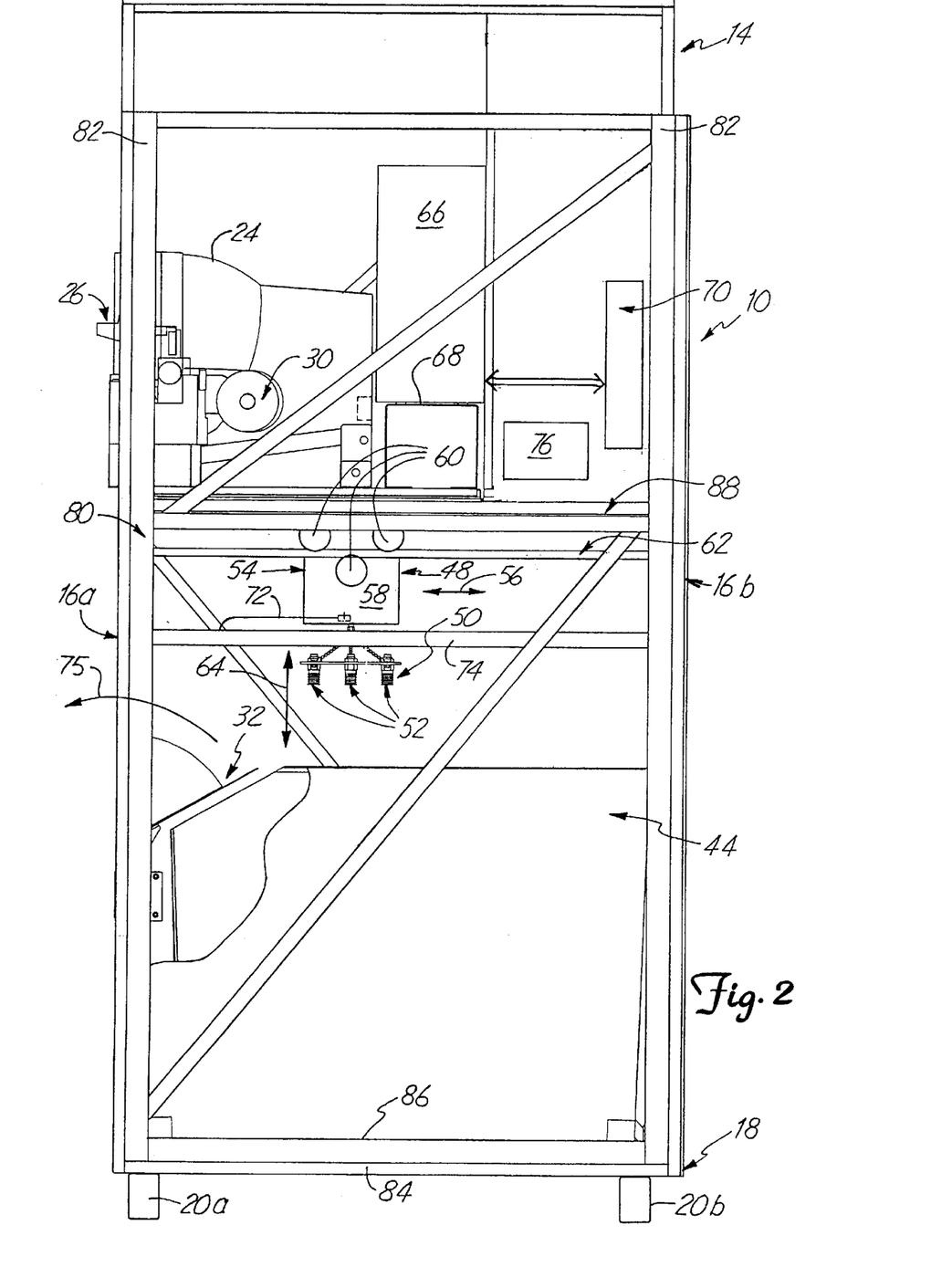
FIG. 2. is a side elevational view of the dispensing machine of FIG. 1 shown with a side panel removed to illustrate an interior compartment of the dispensing machine.

FIG. 2 is a side elevational view of the dispensing machine 10 of the present invention, shown with the panel 16d removed to illustrate the interior components of the dispensing machine 10. Some of the components shown in FIG. 2 have been represented diagramatically for clarity. The dispensing machine 10 is designed to dispense randomly placed articles from a bin 44 through chute 32. Articles are dispensed by operation of a head positioning assembly 48 and pick up head 50. The pick-up head 50 includes a plurality of suction cups 52. Preferably, there are three suction cups 52 which are formed of a flexible material. The suction cups 52 may be bellowed for flexibility. The head positioning assembly 48 moveably supports the pick-up head 50 to locate the pick-up head 50 to retrieve articles from an inner cavity of the bin 44. The head positioning assembly 48 includes a first (or x-axis) bridge assembly 54 for positioning the pick-up head 50 relative to the x-axis (arrow 56) of an opening of the bin 44. The first bridge assembly 54 includes an x-axis bridge 58 and wheels 60. The wheels 60 are rotationally connected to x-axis bridge 58 and move along a track 62 to move the x-axis bridge 58 along the x-axis as indicated by arrow 56. The pick-up head 50 is also raised and lowered relative to the depth of the bin 44 along a z-axis as indicated by arrow 64.

Operation of the dispensing machine 10 is controlled by a central control assembly 66. The central control assembly 66 is a computer having a CPU and programmable memory. The central control assembly 66 is coupled to the monitor 24, card reader 26, printer 30, and LED displays 36a–d (not shown in FIG. 2) for operation of these components. The central control assembly 66 is supported by bracket 68. The CPU is connected to the touch screen monitor 24 via a RS232 cable to display various operating options available to the user. The speakers 22 are controlled by the CPU of the central control assembly 66 in synchronization with the touch screen monitor 24 via a Jakarta Audio Board. The message for the LED displays 36a–d may be easily changed via the computer of the central control assembly 66.

The central control assembly 66 is also coupled with a machine control assembly 70 for operation of the head positioning assembly 48 and the pick-up head 50. The machine control assembly 70 has a CPU and programmable memory. If a user chooses to dispense a product or sample via monitor 24, the central control assembly 66 sends a signal to the machine control assembly 70 to initiate operation of the head positioning assembly 48. The central control assembly 66 sends instructions to the machine control assembly 70 which performs the desired function and returns a message to the central control assembly 66.

In particular, the machine control assembly 70 operates a motor (not shown) which drives the wheels 60 of the x-axis bridge 58 along track 62 for movement of the positioning assembly 48 along the x-axis (arrow 56). The machine control assembly 70 is coupled to the motor (not shown) of the head positioning assembly 48 via cable 72, supported by cross bar 74. A vacuum assembly 76 applies suction pressure to the three suction cups 52 of the pick-up head 50 to force articles in the bin 44 towards the pick-up head 50. Articles are dispensed via chute 32 which rotates between an opened position and a closed position (shown in FIG. 2) as illustrated by arrow 75.

Panels 16 are supported relative to a frame assembly 80 to form the outer cabinet 12. The frame assembly 80 includes frame posts 82, base posts 82, floor 84 and a mid platform 88. Panels 16 are connected between opposed frame posts 82. The panels 16 may be hingedly connected relative to the frame assembly 80 to open and close the panels 16 for access to the interior compartment of the dispensing machine 10. The bin 44 is supported relative to the floor 84 which is supported relative to base posts 82. A side panel 16 may be hingedly connected for access to the bin 44 to fill the bin 44. The mid platform 88 supports components in an upper portion of the dispensing machine 10 as shown. A separate upper portion of the front panel 16a may be hingedly connected to the frame assembly 80 for access to the central control assembly 66, monitor 24, card reader 26, and printer 30.

Figure 3:
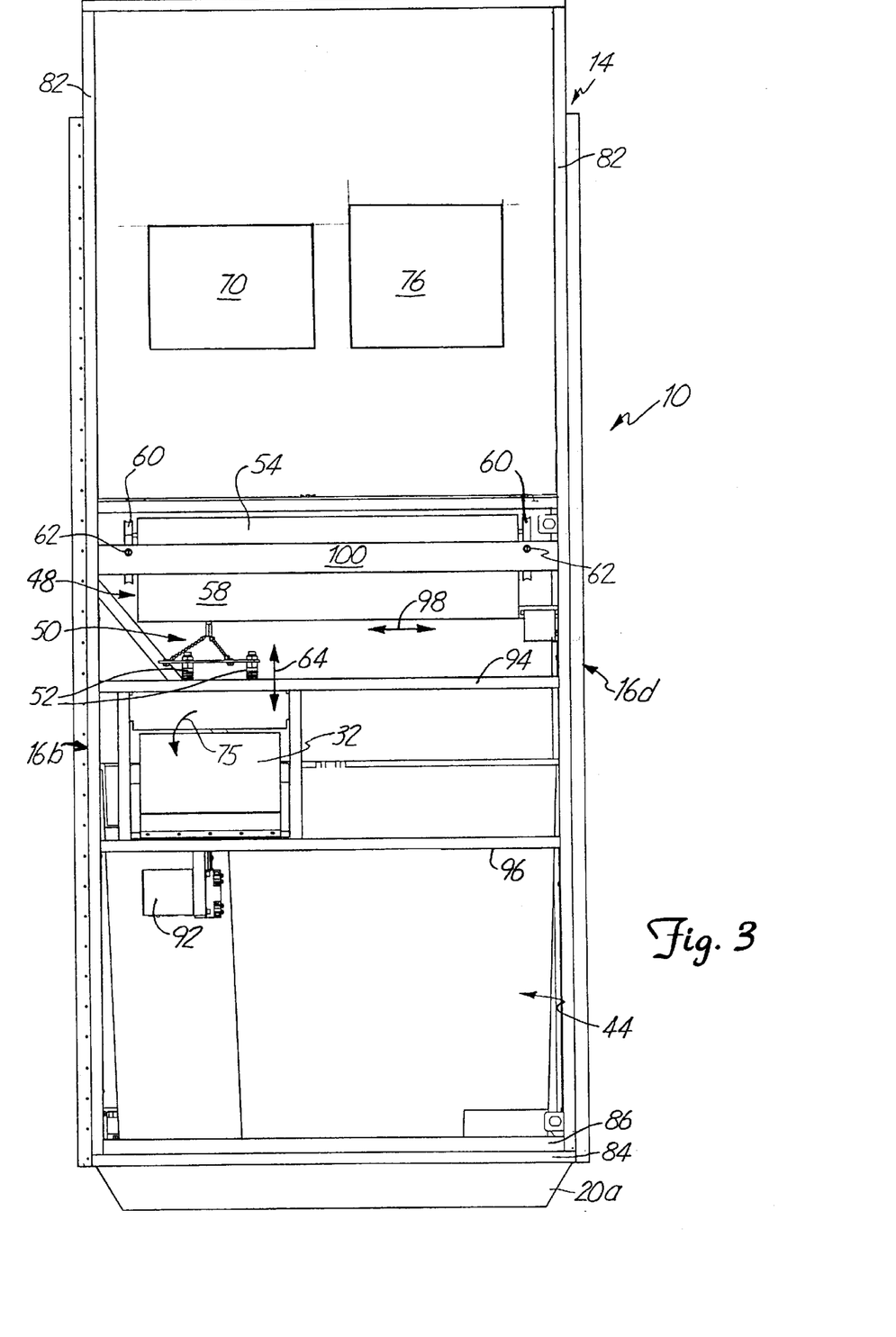
FIG. 3 is a front elevational view of the dispensing machine of FIG. 1 shown with a front panel removed to illustrate an interior compartment of the dispensing machine and shown with the monitor, printer, card reader, and a computer of a central control assembly removed.

FIG. 3 is a front elevational view with the front panel 16a removed and monitor 24, card reader 26, printer 30 and central control assembly 66 shown removed. Some of the components have been represented diagramatically for clarity. As shown, chute 32 is operated by a motor assembly 92 via a signal from the machine control assembly 70. The chute 32 is supported by cross bars 94 and 96 connected to frame posts 82. The pick-up head 50 moves transversely as shown by arrow 98 (along a y axis) relative to the opening of the bin 44. Cross bracket 100 supports track 62 relative to the frame posts 82.

Figure 4:
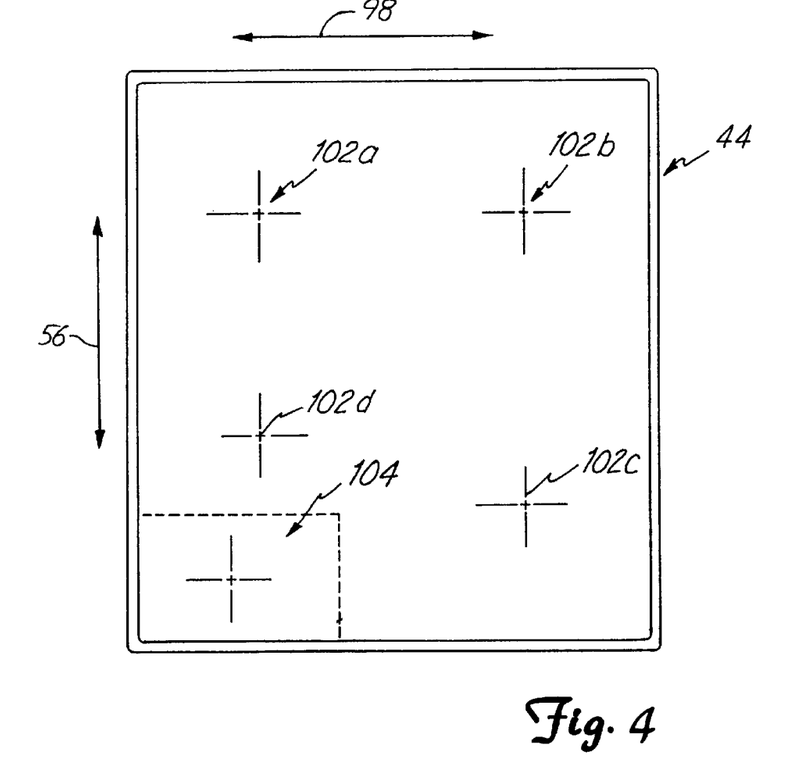
FIG. 4 is a top plan view of a bin illustrating pick-up locations for a pick-up head of the dispensing machine of the present invention.

FIG. 4 is a plan view of a top of the bin 44 illustrating the operational positions of the pick-up head 50 for retrieving articles stored in the bin 44. As previously explained, the head positioning assembly 48 aligns the pick-up head 50 along an x-axis (as indicated by arrow 56) and y-axis (as indicated by arrow 98) relative to the opening of the bin 44 for picking up randomly located articles from the bin 44. As illustrated in FIG. 4, the head positioning assembly 48 (not shown) moves the pick-up head 50 to four pick-up locations 102a–102d for operation of the article dispensing feature of the dispensing machine 10. During operation of the dispensing feature, the pick-up head 50 picks up an articles from bin 44 at one of the four locations 102a–102d. After the pick-up head 50 has successfully picked up an article from bin 44, the head positioning assembly 48 moves the pick-up head 50 to a chute position 104 to dispense the article through chute 32 (not shown in FIG. 4) of the dispensing machine 10. It is understood that additional pick-up locations can be added depending upon the size of bin 44, the pick-up head 50, number of suction cups 52 and the size of articles stored in bin 44. Alternatively, multiple bins 44 may be used to dispense a choice of articles.

In particular, the machine control assembly 70 moves the head positioning assembly 48 to the various pick-up locations 102a–d as illustrated in FIG. 4, via instructions from the central control assembly 66. The head positioning assembly 48 is moved to an initial pick-up position 102a upon command by the user via monitor 24 to initiate an operation cycle. Suction pressure is applied to the suction cups 52 by vacuum assembly 76 to attract articles to the pick-up head 50. If the pick-up head 50 does not successfully attract an article, the positioning assembly 48 sequentially positions the pick-up head 50 relative to alternate pick-up locations 102c–d.

Movement of the head positioning assembly 48 to the various pick-up locations 102a–d is timed. Thus, if the pick-up head 50 does not attract an article at the initial pick-up location 102a, within the allotted time, the head positioning assembly 48 moves the pick-up head 50 to the next pick-up location 102b. The movement of the positioning assembly 48 to the various pick-up locations 102a–d continues until an article is attracted to at least one of the suction cups 52 of the pick-up head 50. Preferably, the positioning assembly 48 moves the pick-up head 50 at least six times to various pick-up locations 102a–d to attempt to attract an article to the pick-up head 50 for dispensing. If the pick-up head 50 does not attract an article on one of the six tries, then the machine control assembly 70 signals to the central control assembly 66 that the bin 44 is empty and the appropriate message is displayed on the monitor 24 to the user to indicate that the machine is empty.

The machine control assembly 70 stores the initial pick-up location 102 for each dispensing cycle and assigns a new initial pick-up location for each operation cycle. Thus, if a first user chooses to dispense an article, the head positioning assembly 48 is moved to a first initial pick-up location 102a. Thereafter, when a second user chooses to dispense an article, the head positioning assembly 48 is moved to a second initial pick-up location 102b to commence operation and so forth. Thus, articles in the bin 44 are evenly depleted and dispensed.

Figure 5:
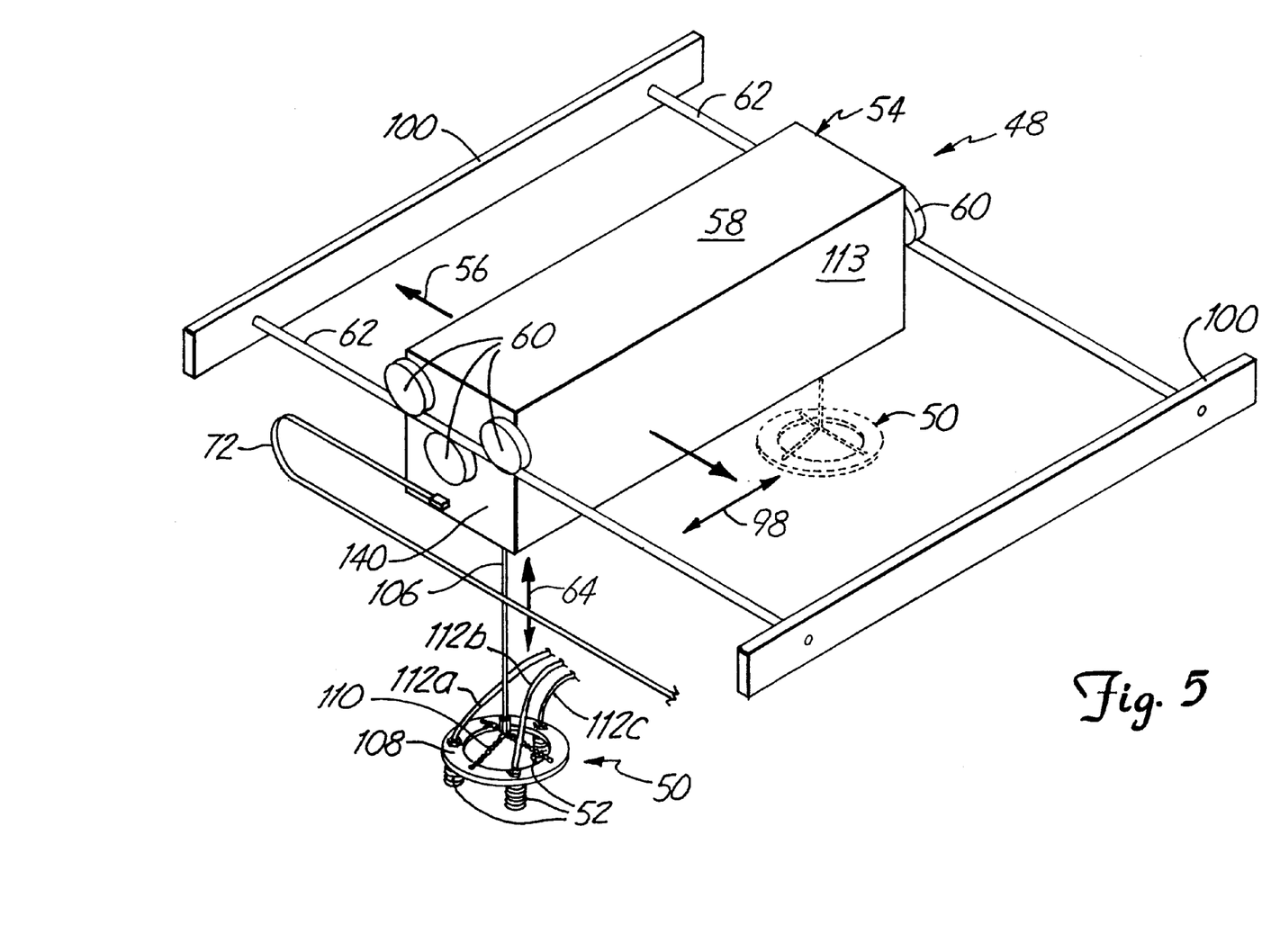
FIG. 5 is a perspective view of the pick-up head and positioning assembly.
Figure 6:
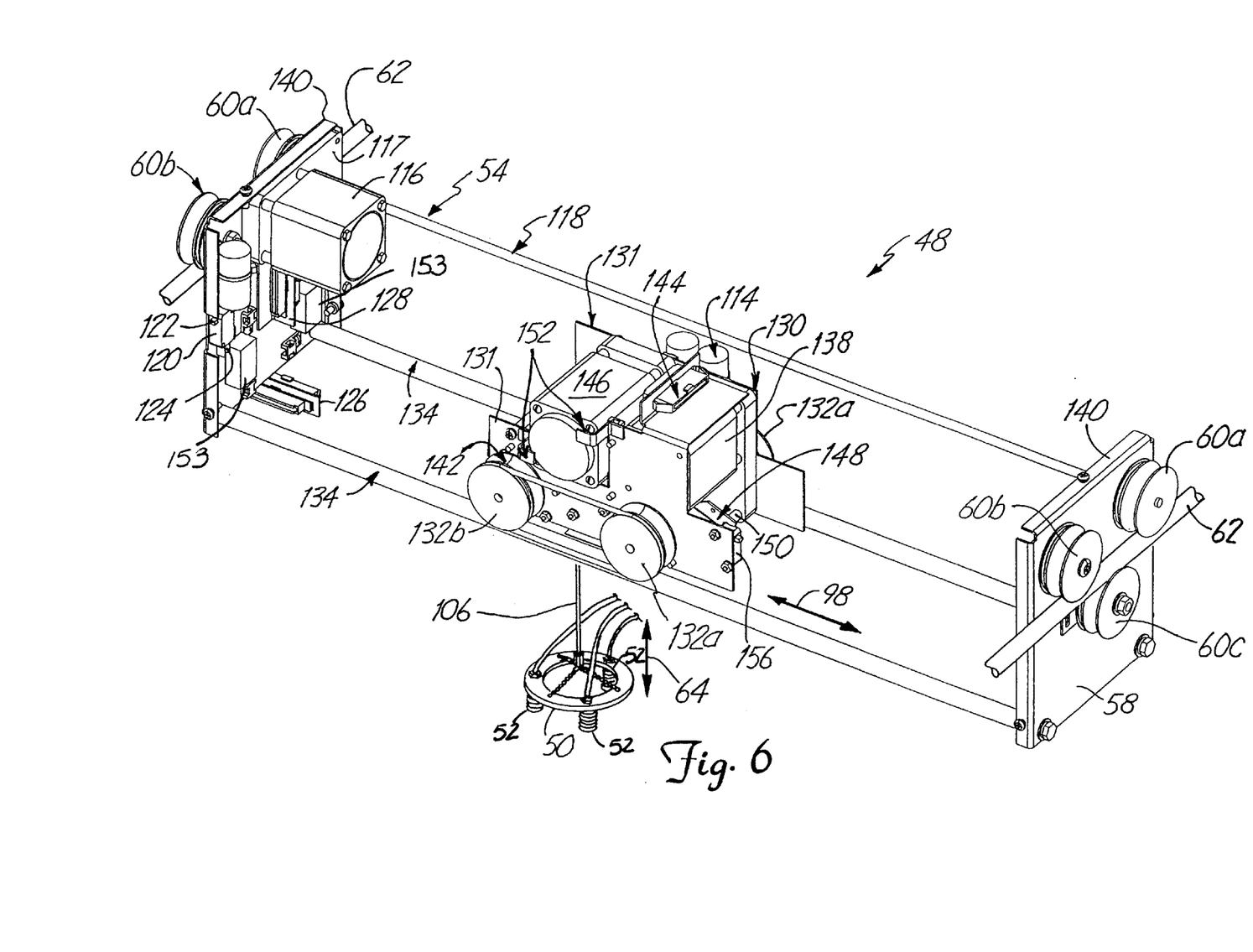
FIG. 6 is a perspective view of an interior of a first or x-axis bridge of the positioning assembly shown with a cover removed for the purpose of illustrating a second or y axis bridge assembly of the positioning assembly.
Figure 7:
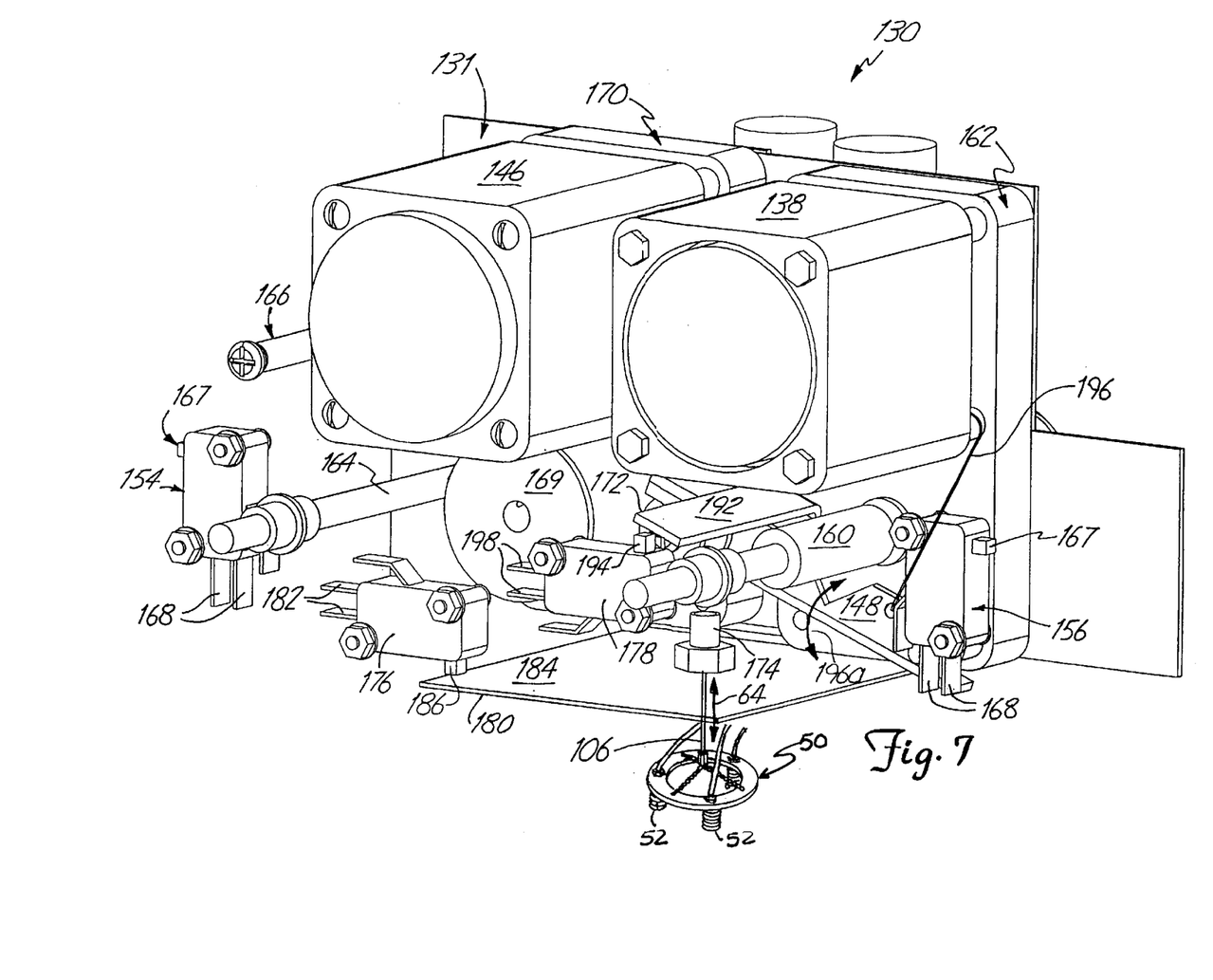
FIG. 7 is a perspective view of a y-axis bridge with a front plate and two wheels removed.

FIG. 5–7 are perspective views illustrating operation of the head positioning assembly 48 and the pick-up head 50. As shown in FIG. 5, the pick-up head 50 is supported by a pulley 106 and includes a support ring 108. The pulley 106 is connected to the support ring 108 of the pick-up head 50 by tri-leg link 110. The suction cups 52 are mounted to and supported by the support ring 108 of the pick-up head 50. Vacuum pressure is independently applied to each of the suction cups 52 via suction channels 112a–c connected to the vacuum assembly 76 (not shown in FIG. 5. The suction cups 52 may be of various shapes and sizes depending on the application. For bigger sized articles, the suction cups 52 may include an elongated flexible portion which allows the suction cups 52 to bend to align with the randomly organized articles.

As previously explained, the first or x-axis bridge assembly 54 moves along the x-axis as shown by arrow 56 via operation of wheels 60 along track 62 formed of spaced rods attached to cross bracket 100. The front and rear pick-up locations 102 for the x-axis bridge assembly 54 are controlled by an x-axis position sensor assembly(not shown). The x-axis position sensor assembly includes a magnet on the moveable x-axis bridge 58 and a magnet sensor coupled to the frame assembly 80 to detect the magnet on the x-axis bridge 58 to locate the position of the x-axis bridge 58 along track 62. The x-axis position sensor assembly is coupled to the machine control assembly 70 to position the x-axis bridge 58 at the various pick-up locations 102a–d.

FIG. 6 is a perspective view of the x-axis bridge assembly 54 shown with a cover 113 removed to illustrate a second or y-axis bridge assembly 114 for operating the pick-up head 50 along the y-axis as illustrated by arrow 98 and x-axis motor 116 for operating the wheels 60 along track 62 to operate the x-axis bridge assembly 54. Rotational motion is transferred directly to wheel 60a (adjacent to the motor 116) by the motor 116 via a gear assembly of gear box 117. Rotational motion is transferred from the motor 116 to the drive wheel 60a on the opposed end of the motor 116 via drive shaft 118. Wheels 60b–c are driven via operation of wheel 60a.

Microswitches 120 are included on a front portion and a rear portion (not shown) of the x-axis bridge 54 to stop the x-axis motor 116 if the motor fails to stop at the pick-up locations 102a–d in response to the x-axis position sensor assembly. The microswitches 120 are actuated by contact of an actuator button 122 with a preset contact (not shown) on the frame assembly 80 of the dispensing machine 10. The terminals 124 of the microswitches 120 are coupled with the x-axis motor 116 to stop the motor 116 in response to contact of the actuator button 122. Cable 72 is coupled to x-axis motor 116 via connector 126 and connector 128 for operation of the motor 116 by the machine control assembly 70.

As previously set forth, the second or y-axis bridge assembly 114 moves the pick-up head 50 along the y-axis as shown by arrow 98. The y-axis bridge assembly 114 includes a y-axis bridge 130 having opposed support plates 131, y axis wheels 132, opposed parallel track rods 134 and a y-axis motor 138. The y-axis wheels 132 operate along the track rods 134 to move the y-axis bridge assembly 114 along the y axis as illustrated by arrow 98. Opposed track rods 134 are supported relative to end plates 140 of the x-axis bridge 58. The y-axis motor 138 operates wheels 132a along the track rods 134 and a drive belt 142 transfers the rotational motion to wheels 132b. A cable (not shown) extends between connector 128 and a connector 144 to transmit the operational instructions via cable 72 (shown in FIG. 5) to the y-axis motor 138 from the machine control assembly 70.

A wench motor 146 operates the pulley 106 to raise and lower the pick-up head 50 within the bin 44. The lowest position of the pulley 106 is controlled by a head down limit actuator 148 rotatably supported by shaft 150. A y-axis position sensor assembly 152 is coupled to the y-axis bridge 130 to define the left and right y-axis position for the pick-up locations 102a–d. The y-axis position sensor assembly 152 is coupled with the machine control assembly 70 for positioning the y-axis bridge 130. The y-axis position sensor assembly 152 may employ a magnet on the y-axis bridge 130 and a magnet sensor on the x-axis bridge 58. Front (not shown in FIG. 6) and rear microswitches 154 and 156 are coupled to a front and rear end of the y-axis bridge 130, respectively, to provide a means for stopping operation of the y-axis bridge 130 at the ends of the opposed track rods 134 if the y-axis motor 138 does not stop the y-axis bridge 130 at the pick-up locations 102a–d.

FIG. 7 is a perspective view of the y-axis bridge 130 shown with a front support plate 131 removed and wheels 132 removed. As shown, the y-axis motor 138 rotates a drive shaft 160 which supports wheels 132a for operation along the tracks rods 134 as shown in FIG. 6. The y-axis motor 138 is coupled to the drive shaft 160 via a gear assembly of gear box 162. The front wheels 132b are supported by a wheel shaft 164 rotationally supported relative to the support plates 131. A connection bolt 166 connects support plates 131 of the y-axis bridge 130. Front and rear microswitches 154 and 156 are actuated via contact of an actuator button 167 relative to end plate 140 of the x-axis bridge 58. Terminals 168 of the microswitches 154 and 156 are coupled with the machine control assembly 70 and y-axis motor 138 to stop operation of the y-axis bridge 130 along track rods 134.

The pick-up head 50 is raised and lowered for movement along the z-axis (arrow 64) by the wench motor 146. The pulley 106 is connected to the pick-up head 50 and is wound about a spool 169 which is rotatably supported relative to the support plates 131. The spool 169 is operably coupled to the wench motor 146 via a gear assembly of gear box 170 to rotatably operate the spool 169 for raising and lowering pulley 106. The pulley 106 extends from the spool 169 around an actuator spool 172 and through a guide tube 174 and is connected to the pick-up head 50. Thus as described, the wench motor 146 rotates spool 169 to move the pick-up head 50 up and down as shown by arrow 64 via pulley 106.

Operation of the pulley 106 is controlled by a head up limit switch 176 (microswitch) and a head down limit switch 178 (microswitch). The head up limit switch 176 is actuated by a head up actuating plate 180 when the pulley 106 and pick-up head 50 are at an upper most position. Terminals 182 of the head up limit switch 176 are operably connected to the wench motor 146 via the machine control assembly 70 to signal when the pick-up head 50 is at the upper most position. The head up actuating plate 180 is an L-shaped plate defining an upright plate portion (not shown) connected relative to a rear support plate 131 and a flexible transverse plate portion 184. The transverse plate portion 184 is aligned to contact actuator button 186 of the head up limit switch 176 when contacted by pick-up head 50 in its upper most raised position. When the pick-up head 50 is lowered from its upper most raised position, contact with the transverse plate portion 184 is released to drop the transverse plate portion 184 to release actuator button 186 of the head-up limit switch 176.

The head down limit switch 178 is coupled to the wench motor 146 and the machine control assembly 70 to indicate when the pick-up head 50 is completely lowered into the bin 44, either at the botton of bin 44 or aligned on top of the articles stored in bin 44. The head down limit switch 178 is actuated by the head down actuator 148 and a head down actuator bracket 192. The head down actuator bracket 192 is perpendicularly connected to the head down actuator 148 and rotatably coupled therewith to align with actuator button 194 of the head down limit switch 178. The head down actuator 148 is normally spring biased by spring 196 upwardly (arrow 196a) to rotate the head down actuator 148 and head down actuator bracket 192 out of alignment with actuator button 194. Actuator spool 172 is coupled with the head down actuator 148 and moveable therewith. When the pulley 106 supports the pick-up head 50 at an elevated position, the weight of the pulley 106 and pick-up head 50 on the actuator spool 172 forces the head down actuator 148 against the spring 194 so that the actuator bracket 192 contacts actuator button 194. Terminals of the head down limit switch 178 are coupled to the machine control assembly 70 and the wench motor 146 to indicate when the pulley and pick-up head 50 are suspended and the weight of the pulley 106 and pick-up head 50 are against actuator spool 172.

Thus, when the pick-up head 50 is supported above articles stored in the bin 44, the weight of the pick-up head 50 and pulley 106 on actuator spool 172 forces the head down actuator 148 coupled therewith against the spring 196 so that head down actuator bracket 192 contacts actuator button 194 of the head down limit switch 178 to lower pulley 106. When the pick-up head 50 is lowered by the wench motor 146 for operation of a pick-up cycle, the weight of the pick-up head 50 continues to force the head down actuator bracket 192 against actuator button 194 of the head down limit switch 178 until the pick-up head contacts a top layer of articles stored in the bin 44 in its lowered position. When the pick-up head 50 is fully lowered to contact articles in the bin 44, the pick-up head 50 rests upon the articles in the bin 44, thus releasing the downward force to actuator spool 172. When weight is released from actuator spool 172, the head down actuator 148 is rotated by spring 196 to release head down actuator bracket 192 from actuator button 194. When actuator button 194 is released, the head down limit switch 178 signals to the machine control assembly 70 to cease operation of the wench motor 146 since the pick-up head 50 is fully lowered for operation. Thereafter, the pick-up head 50 is maintained in its fully lowered position by the machine control assembly 70 for a timed period. After the timed period, the wench motor 146 is operated by the machine control assembly 70 to raise the pulley 106 and pick-up head 50 until the pick-up head 50 contacts actuating plate 180 in its upper most position to signal to stop the wench motor 146.

If none of the suction cups 52 have attracted an article then the positioning assembly 48 moves the pick-up head 50 to the next pick-up location 102a–d to try again. Once the positioning assembly 48 moves the pick-up head 50 to a new pick-up location 102a–d, the machine control assembly 70 signals to the wench motor 146 to lower the pick-up head 50 until the weight of the pick-up head 50 is supported on the articles in bin 44 to release the head down actuator bracket 192 from actuator button 194. After the actuator button 194 is released, the wench motor 146 stops operation for a pre-determined period of time so that articles may be attracted to the suction cups 52a–c of the pick-up head 50. After the timed period, the wench motor 146 raises the pick-up head 50 until the pick-up head 50 contacts the head up actuating plate 180 to stop operation of the wench motor 146 until the next cycle.

Figure 8:
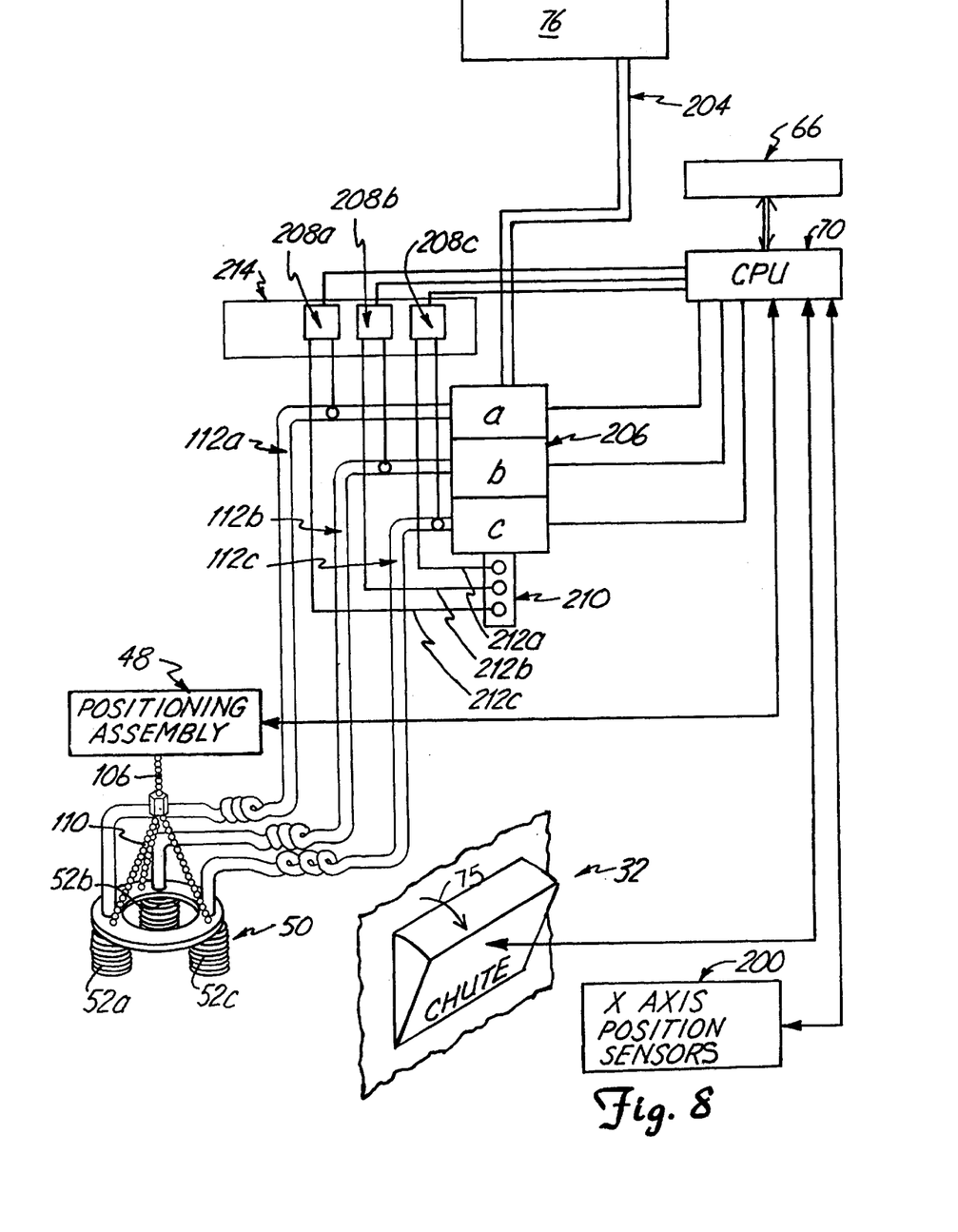
FIG. 8 is a schematic view of the operation of a machine control assembly for operating the positioning assembly, x-axis position sensors, chute and vacuum control assembly.

FIG. 8 is a schematic view of the operation of the machine control assembly 70. The machine control assembly 70 is coupled to the chute 32, the head positioning assembly 48, x-axis position sensor assembly 200. Instructions are transferred between the central control assembly 66 and the machine control assembly 70 to operate the chute 32, the head positioning assembly 48, and the x-axis position sensor assembly 200. The machine control assembly 70 is coupled to the head positioning assembly 48 by a ribbon cable 72 which thereby operates the x-axis bridge assembly 54, the y-axis bridge assembly 114, y-axis position sensor assembly 152, front and rear y-axis micoswitches 154 and 156, the pulley 106 for the pick-up head 50 and the head up limit switch 176 and head down limit switch 178.

The vacuum assembly 76 applies a suction force to the suction cups 52a–c via suction channels 112a–c. A vacuum pump of the vacuum assembly 76 periodically operates to provide suction force on a timed cycle to attract articles in the bin 44 towards the pick-up head 50. The suction pressure applied must be sufficient to attract articles in the bin 44 to the pick-up head 50 depending upon the size and weight of the articles. Preferably, the suction pressure applied is approximately 25 in.Hg.

A vacuum line 204 of the vacuum assembly 76 is connected to a multi-channel solenoid valve 206a–c to apply suction pressure independently to the multiple suction channels 112a–c coupled to the suction cups 52a–c. Preferably three suction cups 52a–c are used however, it should be recognized that any number of suction cups 52 may be used depending upon the application, such as the size of the bin and the articles in the bin. The vacuum assembly 76 may include a silencer to muffle operation of the vacuum pump of the vacuum assembly 76.

Pressure is measured in the suction channels 112a–c by vacuum sensors 208a–c. A manifold assembly 210 separates air from the vacuum line 204 into multiple manifold channels 212a–c. The vacuum sensors 208a–c measure a reference pressure from the suction channels 112a–c connected to the suction cups 52 and the manifold channels 212a–c to measure pressure in the suction channels 112a–b to sense whether a vacuum has been created by contact of a article in the bin 44 with a suction cups 52a–c. A transducer assembly 214 converts the pressure measured by the vacuum sensors 208a–c into an electrical signal which is transmitted to the machine control assembly 70 for operation of the multi-channel valve 206. Operation of the multi-channel valve 206a–c is coupled to the machine control assembly 70 to open and close the channels of the multi-channel valve 206a–c thus defining a vacuum control assembly for controlling suction pressure supplied to the suction cups 52a–c via the suction channels 112a–c.

After the pick up head 50 has been lowered for an operation cycle and has been positioned on top of articles in the bin 44 for a predetermined period of time, the pick-up head 50 is raised. Vacuum pressure is measured in suction channels 112a–c while the pick up head 50 is being raised by the wench motor 146. If a vacuum is detected or sensed in any one of the suction channels 112a–c, then the machine control assembly 70 instructs that all of the valves be closed except one designated valve coupled to a suction channel 112a–c having a vacuum pressure. For example, if a vacuum pressure is sensed or detected in suction channel 112a because an article is attracted to suction cups 52a, valves 206b and 206c are closed. Valve 206a remains open and the suction pressure is supplied to the open valve 206a to hold the article in contact with suction cups 52a so that the head positioning assembly 48 can move the pick-up head 50 to the chute location 104 to dispense the article. Alternatively, if a vacuum pressure is sensed in multiple suction channels such as 112a and 112b then the machine control assembly 70 designates one of the suction cups 52a or 52b and closes the valves 206a and 206c of the non-designated suction cups 52a and 52c (i.e. 52b is the designated suction cups 52) to hold the article in contact with the designated suction cup 52b. Thereafter, the machine control assembly 70 instructs the heading positioning assembly 48 to move the pick-up head 50 to the chute location 104 to dispense a single article.

Before the pick-up head 50 is positioned at the chute location 104, the machine control assembly 70 operates the motor 92 to open the chute 2 (arrow 75) to dispense the article held by one of the suction cups 52a–c of the pick-up head 50. Thereafter, the machine control assembly 70 instructs that the remaining open valve of the designated suction cup 52b be closed to release the product via chute 32. After an article is dispensed the machine control assembly 70 instructs the head positioning assembly 48 to return to a home position and open the valves 206a–c for the next dispensing cycle. If a vacuum is not detected or sensed in any of the suction channels 112a–c then the positioning assembly moves the pick-up head 50 to the next pick-up location 102a–d to repeat the cycle (i.e. lower the pick-up head 50 for a timed period to attract an article in the bin 44 to be dispensed).

Although the present invention has been described with reference to preferred embodiments, workers skilled in the art will recognize that changes may be made in form and detail without departing from the spirit and scope of the invention.

What is claimed is:

1. An apparatus for retrieving randomly organized articles stored in an inner cavity of a bin comprising:
   a frame;
   a pickup head having a plurality of spaced suction cups;
   a positioning assembly operably coupled with the pick-up head and moveably supported relative to the frame for selectively positioning the pick-up head relative to the inner cavity of the bin for retrieving articles;
   a vacuum source coupled to each suction cup for supplying suction pressure to each suction cup to attract articles stored in the bin towards the suction cups;
   means for sensing whether an article is coupled to each of the suction cups; and
   a vacuum control assembly for selectively supplying suction pressure from the vacuum source to each suction cup, the vacuum control assembly being operably coupled to the vacuum source and the means for sensing for selectively controlling suction pressure to each suction cup, the vacuum control assembly supplying suction pressure to each suction cup to attract articles to each suction cup and releasing suction pressure in response to the means for sensing having detected that at least one suction cup has an article coupled thereto, the vacuum control assembly releasing suction pressure to all but one designated suction cup having an article coupled therewith to dispense a single article.

2. The apparatus for retrieving randomly organized articles of claim 1 wherein the pickup head includes three suction cups.

3. The apparatus for retrieving randomly organized articles of claim 1 wherein the positioning assembly aligns the pickup head at a plurality of predetermined locations relative to the bin.

4. The apparatus for retrieving randomly organized articles of claim 3 wherein the positioning assembly moves the pickup head to various predetermined locations at timed intervals.

5. The apparatus for retrieving randomly organized articles of claim 3 wherein the positioning assembly aligns the pick-up head at least six predetermined locations to retrieve an article before the apparatus determines that the bin is empty.

6. The apparatus for retrieving randomly organized articles of claim 1 wherein the positioning assembly moves the pick-up head having an article coupled to one of the suction cups to a dispensing location and the vacuum control assembly releases suction pressure to the designated suction cup to dispense the article.

7. The apparatus for retrieving randomly organized articles of claim 1 wherein the vacuum control assembly comprises:

a multi-channel valve operably coupled to the vacuum source and each suction cup, the multiple channels of the valve being selectively opened and closed to control suction pressure to the suction cups; and     a control assembly coupled with the means for sensing whether an article is coupled to each suction cup and the channels of the multi-channel valve to open and close the multi-channels of the valve.

8. The apparatus of retrieving randomly organized articles of claim 1 wherein the means for sensing whether an article is coupled with each suction cup includes vacuum sensors for sensing a vacuum pressure in a suction channel coupled between the vacuum source and suction cup when an article is coupled to the suction cup.

9. The apparatus for retrieving randomly organized articles of claim 1 wherein the positioning assembly includes:

a first moveable bridge assembly, moveable along a track supported relative to the frame for positioning the bridge assembly along a first axis of the bin;

a second moveable bridge assembly moveable along a track supported relative to and moveable with the first bridge assembly along a second axis of the bin perpendicular to the first axis of the bin;

a moveable pulley assembly for supporting the pickup head relative to the first and second bridge assemblies for raising and lowering the pickup head into the inner cavity of the bin along a third axis perpendicular to the first and second axes;

means for moving the first bridge assembly along the track supported relative to the frame;

means for moving the second bridge assembly along the track supported relative to the first bridge assembly and moveable therewith; and     means for operating the pulley to raise and lower the pickup head within the bin.

10. The apparatus for retrieving randomly organized articles of claim 9 wherein the means for operating the pulley includes:

a motor coupled to the pick-up head by a pulley of the pulley assembly;

a head up actuating assembly coupled to the motor, said head up actuating assembly being actuated via contact of the pick-up head in a raised position;

a head down actuating assembly coupled to said motor and being actuated when the pick-up head is in a lowered position; and     a control assembly coupled to the head up actuating assembly and the head down actuating assembly for controlling operation of motor in response to the head up and head down actuating assemblies, the control assembly lowering the pick-up head for an operation cycle to a lowered position and raising the pick-up head to the raised position.

11. The apparatus for retrieving randomly organized articles of claim 10 wherein the control assembly maintains the pick-up head in the lowered position for a predetermined period of time.

12. A dispensing apparatus comprising:

a frame;

a cabinet supported by the frame and having an inner compartment;

a bin having an inner cavity for storing randomly placed articles;

a pickup head having a plurality of spaced suction cups;

a positioning assembly operably coupled with the pick-up head and moveably supported relative to the frame for selectively positioning the pick-up head relative to the inner cavity of the bin for retrieving articles;

a chute connecting the inner compartment of the cabinet to the exterior of the dispensing apparatus for dispensing an article;

a vacuum source coupled to each suction cup for supplying suction pressure to each suction cup to attract articles stored in the bin towards the suction cups; and     means for sensing whether an article is coupled to each of the suction cups; and     a vacuum control assembly for selectively supplying suction pressure from the vacuum source to each suction cup, the vacuum control assembly being operably coupled to the vacuum source and the means for sensing for selectively controlling suction pressure to each suction cup, the vacuum control assembly supplying suction pressure to each suction cup to attract articles to the suction cup and releasing suction pressure in response to the means for sensing having detected that at least one suction cup has an article coupled thereto, the vacuum control assembly releasing suction pressure to all but one designated suction cup having an article coupled therewith to dispense a single article.

13. The dispensing apparatus of claim 12 wherein the chute is rotatably supported relative to the frame to rotate between an opened position to dispense articles and a closed position further including:

a motor assembly coupled to the chute to open and close the chute to dispense articles from the dispensing apparatus.

14. The dispensing apparatus of claim 12 further comprising:

a plurality of operating options;

a display monitor for displaying operating options; and means for selecting a desired operating option; said means for selecting being coupled with an operation control assembly for executing the desired operating option.

15. The dispensing apparatus of claim 14 wherein the monitor is a touch screen monitor and defines the means for selecting an operating option.

16. The dispensing apparatus of claim 14 further comprising a printer defining an operating option for dispensing a printed document, the operation control assembly being coupled to the printer for operation of the printer in response to selection of the print operating option.

17. The dispensing apparatus of claim 14 further comprising:

a magnetic type card reader coupled to the operation control assembly.

18. A method for retrieving randomly placed articles stored in an inner cavity of a bin, comprising the steps of:

providing a pickup head having a plurality of spaced suction cups;

positioning the pickup head relative to first and second axes of the bin;

providing a suction pressure to the individual suction cups;

lowering the pickup head to a lowered position to align with articles stored in the bin;

sensing a vacuum in each of the suction channels connected to the plurality of spaced suction cups;

releasing suction pressure to all but one of the suction cups having a sensed vacuum therein to retain a single article coupled to the pick-up head;

maintaining the pick-up head in its lowered position for a pre-determined period; and raising the pick-up head prior to sensing a vacuum and releasing suction pressure.

19. The method of claim 18 further comprising:

positioning the pickup head having an article coupled therewith relative to a dispensing chute and releasing pressure to the suction cup for dispensing the article.

* * * * *